United States Patent [19]
Eror et al.

[11] 3,920,781
[45] Nov. 18, 1975

[54] METHOD OF FORMING A CERAMIC DIELECTRIC BODY

[75] Inventors: Nicholas G. Eror, Banks, Oreg.; Ian Burn, Williamstown; Galeb H. Maher, Adams, both of Mass.

[73] Assignee: Sprague Electric Company, North Adams, Mass.

[22] Filed: Apr. 2, 1971

[21] Appl. No.: 130,692

[52] U.S. Cl. .................... 264/61; 161/225; 264/65
[51] Int. Cl.² ......................................... C04B 35/46
[58] Field of Search ............... 264/61, 65; 161/225; 317/261, 25 B; 106/73.2

[56] References Cited
UNITED STATES PATENTS

| | | | |
|---|---|---|---|
| 2,946,937 | 7/1960 | Herbert | 106/73.2 |
| 3,041,189 | 6/1962 | Herbert | 106/73.2 |
| 3,534,238 | 10/1970 | Buehler | 317/258 |
| 3,549,415 | 12/1970 | Capek et al. | 264/61 |
| 3,577,487 | 5/1971 | Sanchez et al. | 264/65 |
| 3,600,484 | 8/1971 | Smoke et al. | 264/65 |

FOREIGN PATENTS OR APPLICATIONS

| | | | |
|---|---|---|---|
| 1,064,325 | 4/1967 | United Kingdom | 51/309 |

*Primary Examiner*—Donald J. Arnold
*Attorney, Agent, or Firm*—Connolly and Hutz

[57] ABSTRACT

Doped barium titanate ceramics that have a large cation/small cation ratio of approximately unity, are fired in a low oxygen partial pressure atmosphere. Appropriate amounts of large or small cations were added to maintain the cation ratio preferably between 0.95 and 1.0. The resultant ceramic material has a high resistivity, a high dielectric constant, and facilitates the utilization of electrodes made of a base metal in the manufacture of monolithic ceramic capacitors.

5 Claims, 5 Drawing Figures

METHOD OF FORMING A CERAMIC DIELECTRIC BODY

BACKGROUND OF THE INVENTION

This invention relates to base metal electrode monolithic ceramic capacitors and method of making same.

Monolithic ceramic capacitors have been manufactured by firing a barium titanate formulation in an oxidizing atmosphere at temperatures up to about 1,000°–1,400°C. This gives high dielectric capacitors that are efficient and reliable. However, firing under these conditions necessitates a highly expensive electrode system, because the electrode material used in such a system must meet at least this series of criteria: (1) must not change phase, but be able to sinter at around the sintering point of the ceramic; (2) must resist complete oxidation under the firing conditions; and (3) must not react with the dielectric material at its maturing temperature. The noble metals meet these requirements, and platinum and palladium have been used with success in the past as electrode materials. These materials are quite expensive to use, however.

Prior art attempts to overcome this economic problem have not been entirely satisfactory. Attempts have been made to fire barium titanate ceramics in a reducing or inert atmosphere so as to facilitate the use of less expensive, base metal electrodes. These attempts have to some extent allowed the use of base metal electrodes, but have been accompanied by a sacrifice in dielectrical properties, as compared with prior art ceramic compositions fired in air.

Accordingly, it is an object of the present invention to produce a monolithic ceramic capacitor system that utilizes base metal electrodes, and maintains a high dielectric constant and a high resistivity.

SUMMARY OF THE INVENTION

A barium titanate ceramic formulation is doped with acceptor or donor ions, or both, and the large cation/small cation ratio thereof is kept at approximately unity by the addition of an appropriate amount of large or small cation replacement ions, such as $Ba^{+2}$, $Ca^{+2}$, $Ti^{+4}$ or $Zr^{+4}$, for the purpose of facilitating the use of base metal electrodes thereon, when fired in a low oxygen partial pressure atmosphere.

An advantage to using barium titanate as a dielectric is that it can be used in the form of very thin sheets because of its high permittivity.

It has been found that in order to produce desirable electrical properties in a barium titanate ceramic unit while firing in a low oxygen partial pressure atmosphere, or a reducing atmosphere, it is necessary to have the large cation/small cation ratio close to unity, preferably between 0.95 and 1.0. Units fired under these conditions had dielectric constants up to approximately 12,000 at 25°C, and nickel electrodes used thereon did not oxidize, but were stable and did not react with the dielectric ceramic. Such units were fired at 1,350°C in $10^{-8}$ atmospheres oxygen partial pressure, and semiconducting behavior thereof is prevented after sintering.

It has been found that if the large cation/small cation ratio extends too far beyond unity, an accompanying decrease in the dielectric constant is observed and sintering problems are encountered. Some prior art failures have been because too high an oxygen pressure had been used in the firing atmosphere and this results in dissolution of the nickel in the ceramic with eventual loss in continuity of the electrodes; it is therefore necessary to maintain absolute control over the firing atmosphere, as well as control over the stoichiometric properties of the ceramic material. It has been found that the firing atmosphere should be maintained below $10^{-7}$ atmospheres oxygen partial pressure for optimum results. Such atmospheres can be attained by the use of suitable gas mixtures, e.g. $CO-CO_2$.

DESCRIPTION OF THE PREFERRED EMBODIMENTS

Figure 1:
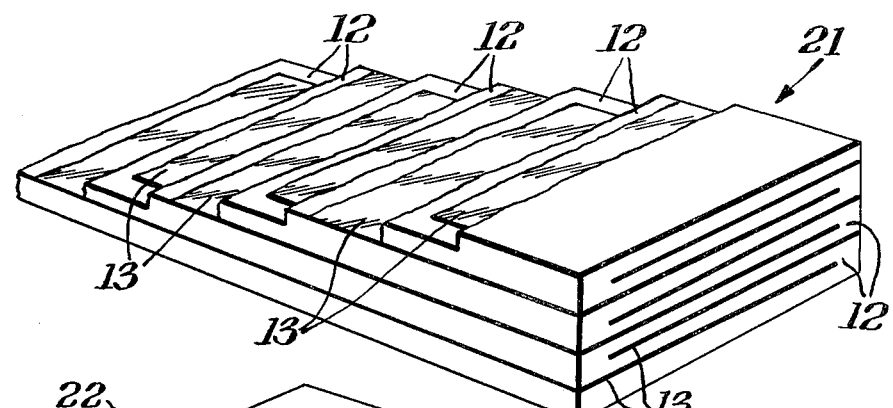
FIG. 1 is a perspective view, partly broken, of a ceramic capacitor showing thin layers of ceramic, each containing a base metal electrode.

Absolutely pure $BaTiO_3$ has a large cation/small cation ratio of unity and could be fired with base metal electrodes in a low oxygen partial pressure atmosphere, but the resulting body would not have certain desirable electrical properties. Consequently, additives are introduced to enhance the electrical properties thereof and facilitate the use of base metal electrodes, but care must be taken to prevent subsequent semiconducting behavior after sintering in low oxygen partial pressure atmospheres.

Dopants, such as $Al^{+3}$, $Cr^{+3}$, $Ni^{+2}$ and $Fe^{+3}$, are made effective in preventing semiconducting behavior after sintering in atmospheres of low oxygen content, by the addition of large cation replacement ions, such as $Ba^{+2}$ or $Ca^{+2}$ or by the addition of small cation replacement ions, such as $Ti^{+4}$ or $Zr^{+4}$. These replacement ions balance the large cation/small cation ratio of a ceramic composition so as to maintain it close to unity. If the ratio is greater than unity 3 then small cation replacement ions should be added; and if the ratio is less than unity, then large cation replacement ions should be added thereto.

For the purposes of this invention, large cations have an ionic radii of more than 0.90 A, and small cations have an ionic radii of less than 0.90 A (measurements as computed by L. Pauling). Therefore, barium with an ionic radius of 1.35 A is a large cation, and titanium having an ionic radius of 0.68 A is a small cation. When dopants are added to barium titanate to enhance its electrical properties, the aforementioned cation ratio is thrown out of the range needed for the purposes of this invention.

Accordingly, the amount (mole percent) of the large cations is determined, and the amount (mole percent) of the small cations present is determined. If the dopants used were all small cations, then BaO (a large cation) is added to bring the cation ratio to about unity. If the cation ratio were thrown out of range because of an excess of large cations, then small cations could be added to return the ratio to unity. All cations present in the mixtures to be fired must be accounted for in determining the ratio, and this includes any impurities present therein.

EXAMPLE 1

A 400 gm. barium titanate ceramic formulation contains approximately (in percent by weight) 89% $BaTiO_3$, 10% $CaZrO_3$, and less than 1% of niobium pentoxide, uranium oxide, and acceptor ions of the transition metal oxides of Fe, Ni and Cr, which were added to improve the electrical properties thereof.

Reference is made to U.S. Pat. No. 2,695,239 to Oshry issued Nov. 23, 1954 and U.S. Pat. No. 2,855,317 to McQuarrie issued Oct. 7, 1958. The cation ratio of this formulation is well below unity and is then brought within the desired range of 0.95–1.0, by the addition of 2.18% by weight of BaO. These oxides are then milled in an organic medium using high purity barium titanate balls and a polyethylene jar mill for a total of 13 hours. Several layers of the above ceramic composition were cast on glass plates, and then a nickel electrode was screened thereon. This procedure was repeated so that the final embodiment consists of at least one internal active dielectric (two electrodes). Finished green units were then removed from the glass plates and fired at 1,350°C for 2 hours with heating and cooling periods of 20 minutes in an atmosphere of 6 parts $CO_2$ to one part CO giving an oxygen partial pressure of $3 \times 10^{-8}$ atmospheres. Acceptor dopants present herein includes $Al^{+3}$ which is present as an impurity in the $BaTiO_3$ and $CaZrO_3$. The niobium or uranium is present as donor ions added to enhance the electrical properties of the ceramic formulation.

After the monolithic units were fired, microscopic observation of the nickel electrodes showed that they remained intact with no oxide present, and no signs of any reactions with the ceramic dielectric. The resistivity of these units was quite high —greater than $10^{12}$ ohm-cm, and the calculated K at 25°C ranged from 9,800 to 12,000. The dissipation factor at 1 kHz, 25°C, and 1 Vac/mil was 2–3.8%. These results are as good as, and in some cases better than, the platinum electroded counterpart fired in air. Samples were life tested at 100 VDC/mil at 125°C for 125 hours, and the leakage resistance during life tests remained relatively constant with a product greater than 100 MΩ μf.

EXAMPLE II

A 400 gm. barium titanate ceramic formulation contains the same additives as the ceramic formulation of Example 1, however, the large cation/small cation ratio of this composition was brought within the desired range by adding 0.80% by weight of CaO instead of BaO.

Monolithic units were prepared in the same manner as in Example I had nickel electrodes thereon and fired at the same temperature and atmosphere, and microscopic observation of the nickel electrodes showed that they remained intact with no oxide present, and no signs of any reactions with the ceramic dielectric. The resistivity of these units were also quite high, and the calculated K at 25°C ranged from 8,000 to 9,000. The dissipation factor at 1 kHz, 25°C and 1 Vac/mil was 2–5%. Samples were life tested at 100 VDC at 125°C for 125 hours, and the leakage resistance during life tests remained relatively constant with product greater than 50 MΩ μf.

It should be noted that the results of Example 11, using CaO to maintain the cation ratio within the desired range, compare favorably with their platinum electroded counterpart fired in air, but are not as desirable as the values achieved with BaO addition of Example 1 and the use of high purity barium titanate balls in the milling process.

The $Al^{+3}$ content of this formulation is greater than that of Example 1 because $Al_2O_3$ balls were used in milling. This in turn requires the use of more large cation replacement ions than Example I and is in large part responsible for the lower dielectric constant of this example.

Figure 2:
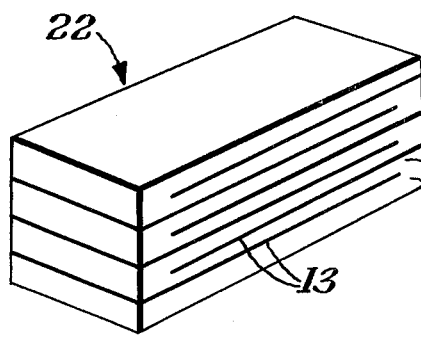
FIG. 2 is a perspective view of a capacitor chip cut from FIG. 1.
Figure 4:
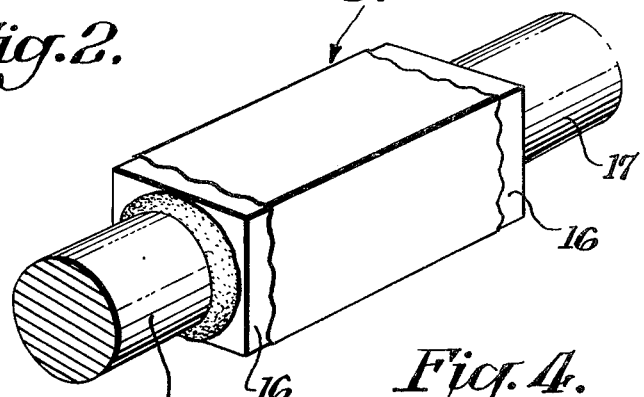
FIG. 4 is a perspective view of the completed monolithic capacitor with leads attached.
Figure 3:
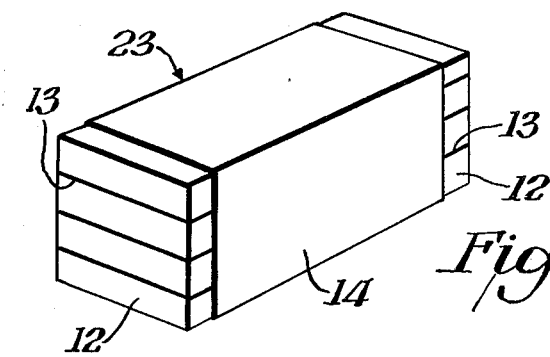
FIG. 3 is a perspective view of the capacitor chip of FIG. 2 with a dielectric coating over the cooperating electrodes.

The units formed in Examples I and 11 can best be illustrated by reference to the drawings. There is shown in FIG. 1, a buildup of ceramic dielectric layers 12 and interleaved layers of long, narrow strips of base metal electrodes 13. The buildup is continued in this fashion as in 21, until the desired number of layers is obtained. It will be noted that each layer of electrode strips 13 is offset somewhat with reference to adjacent layers of electrode strips. Such buildups 21 are then cut or diced to form individual capacitor chips 22 as illustrated in FIG. 2. These individual chips 22 are then coated with a dielectric material 14 over the central portion thereof to cover the edges of the cooperating electrodes 13 exposed by the cutting or dicing as shown in FIG. 3. The units 23 are then fired to maturity at 1,000°–1,400°C. Thereafter the electrode ends of the individual capacitor units 23 are exposed by grinding or abrading to remove any ceramic covering said electrodes. To both ends there is then applied an electrode pick-up 16 to afford electrical communication between the electrodes 13 and to which are affixed leads 17 to complete the capacitor 24 shown in FIG. 4.

Figure 5:
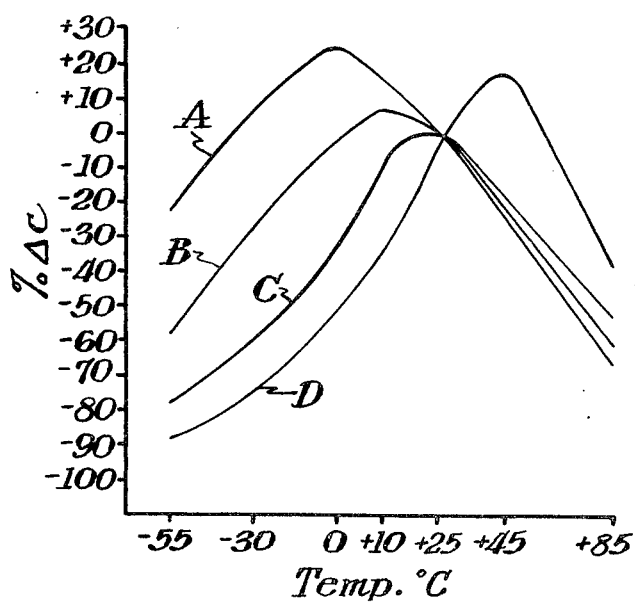
FIG. 5 is a graph showing the shift in Curie points with different firing atmospheres.

Referring to FIG. 5, of the drawings, there is shown a shift in the Curie point with a decrease in the oxygen partial pressure. The curves A, B, C and D are all samples of the composition of Example 1.

A is a body fired at 1,350°C and $1 \times 10^{-7}$ atmospheres oxygen partial pressure.

B is fired at 1,350°C and $3 \times 10^{-8}$ atmospheres oxygen partial pressure.

C is fired at 1,350°C and $1 \times 10^{-8}$ atmospheres oxygen partial pressure.

D is fired at 1,350°C and $1 \times 10^{-9}$ atmospheres oxygen partial pressure.

In order to preserve the high dielectric constant of $BaTiO_3$ while maintaining an insulating body when fired in atmospheres of low oxygen content, a bare minimum of large cation material should be added. So if the amount of alumina contamination during milling were reduced, the amount of large cation replacement ion necessary to maintain an insulating body when fired in atmospheres of low oxygen content could be reduced, and the high dielectric constant can be maintained.

When high purity barium titanate balls are used in the milling process then any "contamination" will be in the form of $BaTiO_3$ (less than 0.5%). Since high purity $BaTiO_3$ has a cation ratio of 1, then no unbalance in the ratio is caused during milling. Barium is the preferred large cation replacement ion because much higher, and more desirable, dielectric constants can be achieved with it.

If the cation ratio is greater than unity, then small cation replacement ions such as $Zr^{+4}$, $Ti^{+4}$ and $Hf^{+4}$ can be added to return the ratio to 0.95–1.0.

It should be noted from FIG. 5 that if a plot were made of the logarithm of oxygen partial pressure against the Curie temperature, it would show a linear relationship.

Large cation acceptors that can be utilized in this invention should be of the "same size" as barium with a valence of less than +2. Small cation acceptors that can be used herein should be of the same size as titanium with a valence of less than +4. But, it is necessary that the ratio of large cation/small cation be maintained close to unity, preferably between 0.95 and 1.0, so as to render the acceptors and/or donors "effective." If the ratio were allowed to go beyond this range, for example to 1.05, then sintering problems would be encountered and a drastic drop in the dielectric constant of the ceramic material will result.

Some large cations that can be used as acceptors herein include sodium, potassium, cesium, copper, silver, gold, francium, tellurium and rubidium. Some small cations available as acceptors include aluminum, boron, beryllium, cobalt, gallium, indium, zinc, chromium, iron, magnesium, nickel, lithium, arsenic, phosphorous, antimony, germanium, ytterbium and manganese.

Some cation replacement ions employed for the purpose of maintaining the cation ratio close to unity include $Ba^{+2}$, $Ca^{+2}$, $Sr^{+2}$, $Mg^{+2}$, $Ti^{+4}$, $Zr^{+4}$ and $Hf^{+4}$. The small cation acceptors can also be used to advantageously maintain the cation ratio within the desired range.

In preferred embodiments of the present invention, compounds are added to enhance the electrical properties of the bodies produced therein. These can be donor ions and include niobium and uranium. The transition metal oxides (iron, nickel and chromium), as acceptors, are also added to enhance electrical properties, and all of these being small cations brings the cation ratio below unity. Accordingly, large cation replacement ions must be added to return the ratio to within the range of 0.95 to 1.0 so that the ceramic bodies formed therefrom having base metal electrodes may be successfully fired in a low oxygen partial pressure atmosphere.

Although 2.18% BaO was used in Example 1 to balance the cation ratio thereof, it should be emphasized that as much cation replacement ions can be added as is necessary to balance the large cation/small cation ratio. It should be remembered that a wider firing range can be achieved with a higher content of BaO, but such a higher content also causes a lower dielectric constant. Other donor ions, in addition to niobium and uranium that could be added to the basic $BaTiO_3$ body includes vanadium, tungsten, molybdenum and tantalum.

Although nickel is used as the preferred electrode herein, any economical base metal or alloy may be used as an electrode herein, with similar but less desirable results. It should be noted that any metal or alloy used as an electrode within the scope of this invention should have a melting point that is higher than the firing temperature, and should have a compatible oxide equilibrium oxygen pressure at the firing temperature. Some metals that could be used therefor include nickel, cobalt, iron and certain alloys thereof.

And while $BaTiO_3$ is the preferred ceramic material used herein, other titanates may be used with similar, although somewhat less desirable results.

Since it is obvious that many changes and modifications can be made in the above-described details without departing from the nature and spirit of the invention, it is to be understood that the invention is not limited to said details except as set forth in the appended claims.

What is claimed is:

1. A method of fabricating a high resistivity ceramic dielectric body including the steps of forming a slip suspension of a barium titanate ceramic containing acceptor ions selected from the group consisting of oxides of (1) aluminum, boron, beryllium, cobalt, gallium, indium, zinc, chromium, iron, magnesium, nickel, lithium, germanium, ytterbium, and manganese, and (2) sodium, potassium and copper and an organic binder, forming a plurality of layers of said ceramic and interleaving at least one base metal electrode selected from the group consisting of nickel, cobalt, iron and alloys thereof and firing said layers, wherein the improvement comprises balancing the large cation/small cation ratio of said ceramic to above 0.95 and no more than 1.0 by adding at least one cation replacement ion selected from the group consisting of $Ca^{+2}$, $Sr^{+2}$, $Ba^{+2}$, $Mg^{+2}$, $Ti^{+4}$, $Zr^{+4}$ and $Hf^{+4}$, and said firing is in the temperature range of 1,000°C to 1,400°C in a mixture of at least two gases, said mixture having a partial oxygen pressure not exceeding $10^{-7}$ atmospheres thereby producing a ceramic dielectric body that has at least one portion having a resistance capacity product of at least 50 M$\Omega$ $\mu$f at above 100°C.

2. The method of claim 1 wherein said produced ceramic dielectric body has a dielectric constant of at least 8000.

3. The method of claim 1 wherein the titanate ceramic may also be doped with at least one donor ion selected from the group consisting of niobium, uranium, vanadium, tungsten, molybdenum and tantalum.

4. The method of claim 1 wherein said acceptor ions are aluminum, iron, nickel and chromium, said cation replacement ion is $Ca^{+2}$, and said titanate is $BaTiO_3$.

5. The method of claim 1 wherein said acceptor ions are aluminum, iron, nickel and chromium, said cation replacement ion is $Ba^{+2}$, and said titanate is $BaTiO_3$.

* * * * *